US006853294B1

(12) United States Patent
Ramamurthy et al.

(10) Patent No.: US 6,853,294 B1
(45) Date of Patent: Feb. 8, 2005

(54) NETWORKING APPLICATIONS FOR AUTOMATED DATA COLLECTION

(75) Inventors: Shashi Ramamurthy, White Plains, NY (US); Rene D. Martinez, Ossining, NY (US)

(73) Assignee: Intermec IP Corp., Woodland Hills, CA (US)

( * ) Notice: Subject to any disclaimer, the term of this patent is extended or adjusted under 35 U.S.C. 154(b) by 434 days.

(21) Appl. No.: 09/625,647

(22) Filed: Jul. 26, 2000

(51) Int. Cl.[7] .......................... H04Q 5/22; G08B 13/14; G06F 15/16

(52) U.S. Cl. .................. 340/10.1; 340/10.4; 340/572.1; 709/219

(58) Field of Search ............................... 340/10.1, 10.2, 340/10.3, 10.4, 10.41, 572.1, 572.2, 572.3, 572.4, 572.5, 572.6, 572.7, 572.8, 572.9; 709/219

(56) References Cited

U.S. PATENT DOCUMENTS 4,924,210 A * 5/1990 Matsui et al. ............ 340/10.41
5,869,819 A * 2/1999 Knowles et al. ............ 235/375
5,903,729 A * 5/1999 Reber et al. ................ 709/219
6,211,781 B1 * 4/2001 McDonald .................. 340/505
6,362,737 B1 * 3/2002 Rodgers et al. ............ 340/10.1
6,400,272 B1 * 6/2002 Holtzman et al. ....... 340/572.1

FOREIGN PATENT DOCUMENTS

GB 2327565 A * 1/1999 ............ H04Q/7/22

OTHER PUBLICATIONS

"Data packet." Newton's Telecom Dictionary. 18th ed. 2002.*
"Port." Newton's Telecom Dictionary. 18th ed. 2002.*
"URL." Newton's Telecom Dictionary. 18th ed. 2002.*
"World Wide Web." Newton's Telecom Dictionary. 18th ed. 2002.*

* cited by examiner

*Primary Examiner*—Brian Zimmerman
*Assistant Examiner*—Clara Yang
(74) *Attorney, Agent, or Firm*—O'Melveny & Myers LLP

(57) ABSTRACT

An RFID reader directly controls computer network applications on the basis of information collected from an RFID tag. The RFID tag includes certain designated fields that identify a destination computer system and/or application program for data recovered from the RFID tag. The RFID reader can then distribute the collected information in a format and to a destination that is determined by the RFID tag, thereby eliminating the need for intermediary software programs or human operators to make such decisions about the distribution of information. This capability permits RFID tag information to be automatically collected and distributed to network applications for ultimate data processing and collection.

7 Claims, 2 Drawing Sheets

NETWORKING APPLICATIONS FOR AUTOMATED DATA COLLECTION

BACKGROUND OF THE INVENTION

1. Field of the Invention

The present invention relates to automated data collection systems that collect information from radio frequency identification (RFID) transponders, and more particularly, to an automated data collection system that uses the information encoded in the RFID transponder to control certain network applications.

2. Description of Related Art

In the automatic data identification industry, the use of RFID transponders (also known as RFID tags) has grown in prominence as a way to track data regarding an object to which the RFID transponder is affixed. An RFID transponder generally includes a semiconductor memory in which digital information may be stored, such as an electrically erasable, programmable read-only memory (EEPROMs) or similar electronic memory device. Under a technique referred to as "backscatter modulation," the RFID transponders transmit stored data by reflecting varying amounts of an electromagnetic field provided by an RFID interrogator by modulating their antenna matching impedances. The RFID transponders can therefore operate independently of the frequency of the energizing field, and as a result, the interrogator may operate at multiple frequencies so as to avoid radio frequency (RF) interference, such as utilizing frequency hopping spread spectrum modulation techniques. The RFID transponders may either extract their power from the electromagnetic field provided by the interrogator, or include their own power source.

Since RFID transponders do not include a radio transceiver, they can be manufactured in very small, lightweight and inexpensive units. RFID transponders that extract their power from the interrogating field are particularly cost effective since they lack a power source. In view of these advantages, RFID transponders can be used in many types of applications in which it is desirable to track information regarding a moving or inaccessible object. One such application is to affix RFID transponders to packages or parcels moving along a conveyor belt. The RFID transponders would contain stored information regarding the packages, such as the originating or destination address, shipping requirements, pick-up date, contents of the package, etc. An RFID interrogator disposed adjacent to the conveyor belt can recover the stored information of each RFID transponder as it passes no matter what the orientation of the package on the conveyor belt. The RFID interrogator may then communicate the collected information to a computer or computer network for further processing by a software application.

A drawback of conventional automated data collection systems is that the conveyance of information from the RFID interrogator to the software application operating on a computer or computer network is independent of the information content. The interrogator generally forwards the collected information to the software application irrespective of the content of the information, and the software application then determines what actions to take with respect to the information. There presently exist many known RFID transponder types having unique data formats and protocols, with each such format and protocol being generally incompatible with each other. More than one type of RFID transponder may be present within the operating environment of a single RFID interrogator, such as a first type of RFID transponder disposed on a truck and a second type of RFID transponder disposed on a pallet carried by the truck. Thus, separate software applications may be used to process the information from each of the RFID transponder types, and yet another software application may be used to distinguish between the collected information and route the information to the appropriate software application for subsequent processing. The use of a software application to provide the routing function necessarily limits the flexibility of the network applications that use the collected information.

It would therefore be desirable to provide an automated data collection system in which the RFID interrogator can convey collected information to different locations, computers and/or software applications based on the information content of the RFID transponder.

SUMMARY OF THE INVENTION

The present invention provides an RFID reader for use in a computer network in which the RFID reader can control networking applications on the basis of information collected from an RFID tag. The RFID tag is provided with certain designated fields that identify a destination computer system and/or application program for data recovered from the RFID tag. The RFID reader can then distribute the collected information in a format and to a destination that is determined by the RFID tag, thereby eliminating the need for intermediary software programs or human operators to make such decisions about the distribution of information. This capability permits RFID tag information to be automatically collected and distributed to network applications for ultimate data processing and collection.

In accordance with a first embodiment of the invention, an RFID reader detects data stored in certain predetermined fields of an RFID tag and conveys information collected from the RFID tag to external computer systems and/or application programs on the basis of the data from the predetermined fields. The RFID reader further comprises a radio module and a processor connected to the radio module. The radio module is responsive to commands provided by the processor to perform transmit and to receive operations with at least one RFID tag. The RFID reader further comprises a memory coupled to the processor and having program instructions stored therein. The processor is operable to execute the program instructions, including detecting data loaded in the designated field of a memory of the RFID tag and communicating information to external systems connected to the RFID reader regarding the RFID tag responsive to the detected data.

Another embodiment of the invention comprises a computer network including a server having a plurality of application programs operating thereon, and at least one client computer connected to the server. An RFID reader is connected to the server and is adapted to communicate with RFID tags having a memory containing a designated field for storage of data. The RFID reader provides a message to the server regarding one of the RFID tags directed to a particular one of the plurality of application programs selected in accordance with data stored in the designated field of the RFID tag. The data stored in the designated field may include an address of a particular destination computer system connected to the network and/or a protocol used by the RFID tag. The RFID reader then communicates information to the server in accordance with the protocol. The plurality of application programs operative on the server may comprise an e-mail program, a website hosting program, a database program, and the like.

A more complete understanding of the networking applications for automated data collection will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for an automated data collection system in which the RFID interrogator can convey collected information to different locations, computers and/or software applications using the information content of the RFID transponder. In the detailed description that follows, like element numerals are used to describe like elements illustrated in one or more of the figures.

Figure 1:
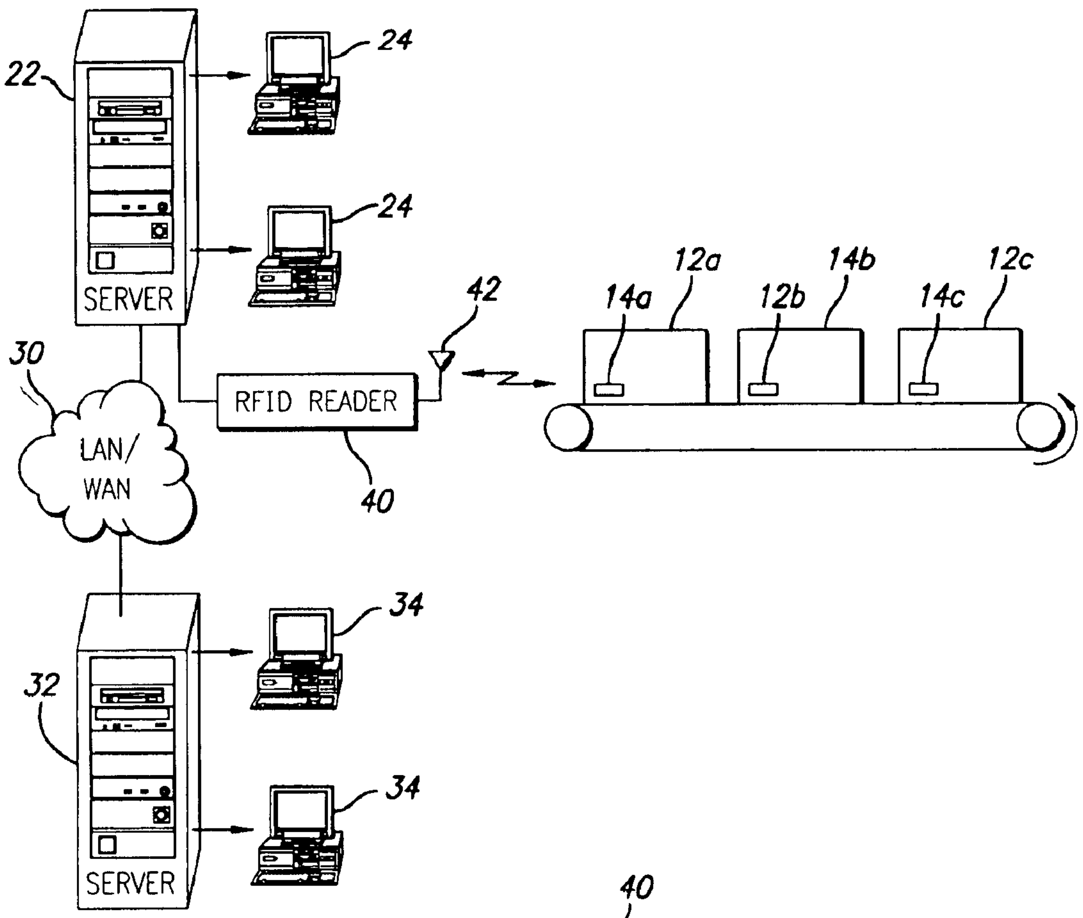
FIG. 1 is a block diagram illustrating a computer network having an RFID reader arranged to read data from a plurality of RFID transponders.

Referring first to FIG. 1, an automated data collection environment is illustrated that includes a computer system forming part of a local area network (LAN) or wide area network (WAN). The computer system includes a server computer 22 attached to the LAN/WAN 30, and has plural client computers 24 connected to the server computer. The client computers 24 may each be a personal computer having a processor and non-volatile data storage device, such as a hard disk drive, optical disk drive, and the like. A user can enter commands and information into each client computer 24 through input devices such as a keyboard, mouse, microphone, joystick, game pad, scanner, etc. A monitor or other display device coupled to the each client computer 24 provides visual output to the user. Other output devices coupled to each client computer 24 may include printers, speakers, etc. The server computer 22 may comprise a high-speed microcomputer, minicomputer or mainframe computer that acts as a conduit for communication of data packets between the client computers 24 and the outside world. Although two client computers 24 are shown in FIG. 1, it should be appreciated that a large number of client computers may be coupled to the server computer 22. The server computer 22 may also provide various system applications for the client computers 24, such as electronic mail (e-mail), central file management, database, etc. The computer system permits the server and client computers 22, 24 to communicate with a remote computer such as personal computers 34 coupled to a remote server computer 32.

The LAN/WAN 30 may further comprise the Internet or a corporate intranet. As known in the art, the Internet is made up of more than 100,000 interconnected computer networks spread across over one hundred countries, including commercial, academic and governmental networks. Businesses and other entities have adopted the Internet as a model for their internal networks, or so-called "intranets." The server computers 22, 32 may facilitate routing of messages over the LAN/WAN 30 between end users at the personal computers 24, 34. Messages transferred between computers within a network are typically broken up into plural data packets. Packet switching systems are used to route the data packets to their required destination and enable the efficient handling of messages of different lengths and priorities. Since each data packet includes a destination address, all packets making up a single message do not have to travel the same path. Instead, the data packets can be dynamically routed over the interconnected networks as circuits become available or unavailable. The destination computer receives the data packets and reassembles them back into their proper sequence to reconstruct the transmitted message. The client computers 24, 34 may include a browser application that enables the user to view graphical information communicated across the computer network, including a portion of the Internet referred to as the World Wide Web.

Computer networks generally use the TCP/IP communications protocol, which is an acronym for Transmission Control Protocol/Internet Protocol. The TCP portion of the protocol provides the transport function by breaking a message into smaller packets, reassembling the packets at the other end of the communication network, and re-sending any packets that get lost along the way. The IP portion of the protocol provides the routing function by giving the data packets an address for the destination network and client at the destination address. Each data packet communicated using the TCP/IP protocol includes a header portion that contains the TCP and IP information.

The computer system further includes an RFID reader 40 coupled to the server computer 22. The RFID reader 40 is adapted to read encoded data stored in RFID tags 14*a*–14*c*. The RFID reader 40 may have a hard-wired link to the server computer 22, or alternatively, may communicate over an RF or optical data link. The RFID reader 40 includes an antenna 42 that permits RF communication with the RFID tags 14*a*–14*c*. As shown in FIG. 1, the RFID tags 14*a*–14*c* are affixed to packages 12*a*–12*c*, respectively, that may be in motion with respect to the RFID reader 40. For example, the RFID reader 40 may be mounted in a fixed location with respect to a conveyor belt on which a plurality of packages 12*a*–12*c* is transported. Alternatively, the RFID reader 40 may be disposed adjacent to a doorway through which packages 12*a*–12*c* are transported in a single direction or in both directions simultaneously. In either case, the RFID reader 40 reads the data stored in each RFID tag 14*a*–14*c* as the tag passes thereby. While the RFID reader 40 is generally described herein as being mounted in a fixed position with respect to the RFID tags 14*a*–14*c*, it should also be appreciated that aspects of the invention would be equally applicable to a hand-held reader that is manipulated by a user into proximity with the RFID tags.

Figure 2:
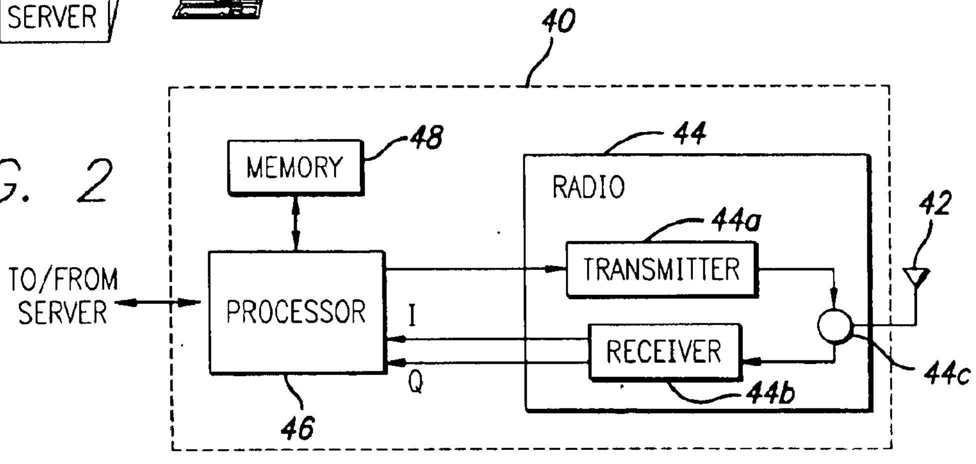
FIG. 2 is a block diagram of the RFID reader of FIG. 1.

Referring now to FIG. 2, the RFID reader 40 is illustrated in greater detail. The RFID reader 40 comprises a processor 46, a memory 48 and a radio module 44. The processor 46 processes data signals received from the RFID tags 14*a*–14*c* and communicates with the server computer 22. The term "processor" as generally used herein refers to any logic processing unit, such as one or more central processing units (CPUs), digital signal processors (DSPs), application specific integrated circuits (ASICs), field programmable gate arrays (FPGAs), and the like. The memory 48 includes a random access memory (RAM) and a read-only memory (ROM) to provide storage for program instructions, parameters and data for the processor 46. More particularly, the memory 48 contains stored instructions that are executed by the processor 46 to cause the processor to receive, write, and/or manipulate data recovered from the RFID tags 14*a*, 14*c*. The memory 48 may further comprise a flash memory or electronically erasable programmable read-only memory (EEPROM). The server computer 22 may communicate new, revised or additional instruction sets to the processor 46 for storage within the memory 48 in order to modify operation of the RFID reader 40.

The radio module 44 provides for RF communications to/from the RFID tags 14*a*–14*c* under the control of the processor 46. The radio module 44 further comprises a transmitter portion 44*a*, a receiver portion 44*b*, and a hybrid 44*c*. The antenna 42 is coupled to the hybrid 44*c*. The hybrid 44*c* may further comprise a circulator, directional coupler, or like component that permits bi-directional communication of signals with sufficient signal isolation. The transmitter portion 44*a* includes a local oscillator that generates an RF carrier frequency. The transmitter portion 44*a* sends a transmission signal modulated by the RF carrier frequency to the hybrid 44*c*, which in turn passes the signal to the antenna 42. The antenna 42 broadcasts the modulated signal and captures signals radiated by the RFID tags 14*a*–14*c*. The antenna 42 then passes the captured signals back to the hybrid 44*c*, which forwards the signals to the receiver portion 44*b*. The receiver portion 44*b* mixes the captured signals with the RF carrier frequency generated by the local oscillator to directly downconvert the captured signals to a baseband information signal. The baseband information signal may comprises two components in quadrature, referred to as the I (in phase with the transmitted carrier) and the Q (quadrature, 90 degrees out of phase with the carrier) signals. The hybrid 44*c* connects the transmitter 44*a* and receiver 44*b* portions to the antenna 42 while isolating them from each other. In particular, the hybrid 44*c* allows the antenna 42 to send out a strong signal from the transmitter portion 44*a* while simultaneously receiving a weak backscattered signal reflected from the RFID tags 14*a*–14*c*.

Figure 3:
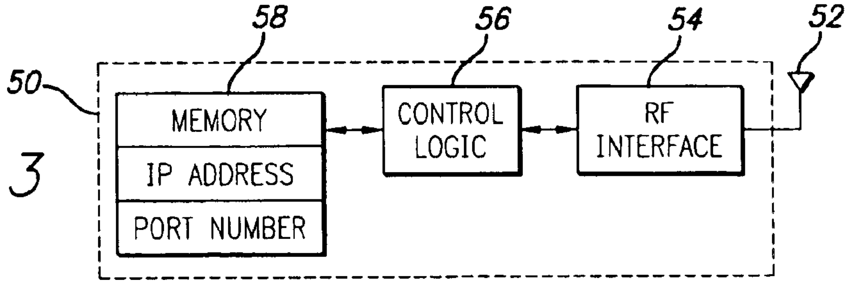
FIG. 3 is a block diagram of an RFID transponder of FIG. 1.

Referring now to FIG. 3, an exemplary RFID tag 50 is illustrated in greater detail. The RFID tag 50 corresponds to the RFID tags 14*a*–14*c* described above with respect to FIG. 1. More particularly, the RFID tag 50 includes an RF interface 54, control logic 56 and memory 58. The RF interface 54 is coupled to an antenna 52, and may include an RF receiver that recovers analog signals that are transmitted by the RFID reader 40 and an RF transmitter that sends data signals back to the RFID reader. The RF transmitter may further comprise a modulator adapted to backscatter modulate the impedance match with the antenna 52 in order to transmit data signals by reflecting a continuous wave (CW) signal provided by the RFID reader 40. The control logic 56 controls the functions of the RFID tag 50 in response to commands provided by the RFID reader 40 that are embedded in the recovered RF signals. The control logic 56 accesses the memory 58 to read and/or write data therefrom. The control logic 56 also converts analog data signals recovered by the RF interface 54 into digital signals comprising the received commands, and converts digital data retrieved from the memory 58 into analog signals that are backscatter modulated by the RF interface 54. The RFID tag 50 may be adapted to derive electrical power from the interrogating signal provided by the RFID reader 40, or may include an internal power source (e.g., battery).

The memory 58 of the RFID tag 50 contains a space for data storage having plural fields that may be defined by an end user of the automated data collection system. In the present invention, at least two of the fields are predefined, including an IP Address field and a Port Number field. The IP Address field and Port Number field enable the RFID reader 40 to route data within the computer system in the same manner that these fields of a TCP/IP data packet permit routing within a computer network. In an embodiment of the invention, the IP Address field designates a destination computer system that should be provided with the data and the Port Number designates a protocol and associated software application that supports the protocol. Depending upon a particular protocol and associated software application that is designated by a particular Port Number, additional information contained in other fields of the memory 58 can be accessed.

Figure 4:
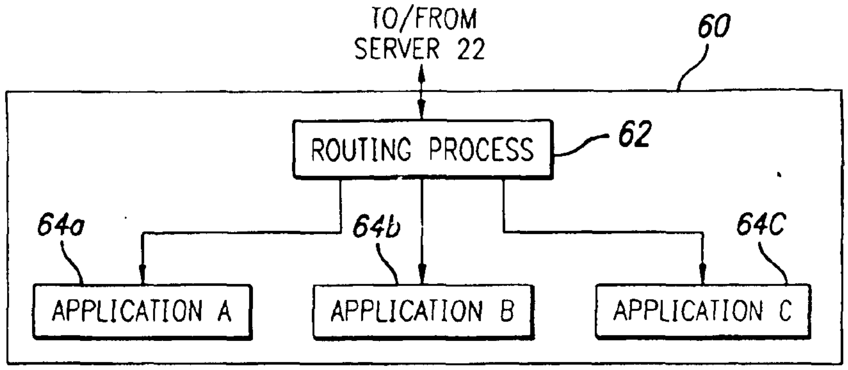
FIG. 4 is a block diagram illustrating an operating system environment of a server of the computer network.

Referring now to FIG. 4 in conjunction with FIG. 1 (described above), an operating system environment 60 of the server 22 is illustrated. The operating system environment 60 depicts the interconnection between received data packets and applications running on the operating system of the server. Particularly, the operating system environment 60 includes a routing process 62 and plural application programs 64*a*–64*c*. The routing process 62 determines the routing of data packets into and out of the server 22. The routing process 62 may include a table that defines the addresses and interconnection pathways between the server 22, the client computers 24, and the RFID reader 40. The routing process 62 may further communicate with one or more network interfaces used to transfer data packets into and out of the server 22. The application programs 64*a*–64*c* each provide a specific function, and may include an e-mail program, a database program, a Website host, etc. Data packets generated either within the computer network, or external to the network, are directed first to the routing process 62 and are then forwarded to an appropriate one of the application programs 64*a*–64*c*. The server 22 may have a designated IP Address, and each of the application programs 64*a*–64*c* running on the server may have a designated Port Number. Similarly, the application programs 64*a*–64*c* may send data packets through the routing process 62 for delivery to another location either within the computer network or external to the computer network.

For example, an e-mail message directed to a particular client computer 24 in the network from external to the LAN/WAN would be communicated in the form of one or more data packets that pass first through the operating system environment 60 of the server 22. The routing process 62 would direct the data packets to one of the application programs, such as application 64*a*, that provides an e-mail host program. A user at one of the client computers 24 can then access the message by communicating with the server 22, which sends the message in the form of data packets back through the routing process 62 to the client computer 24.

Figure 5:
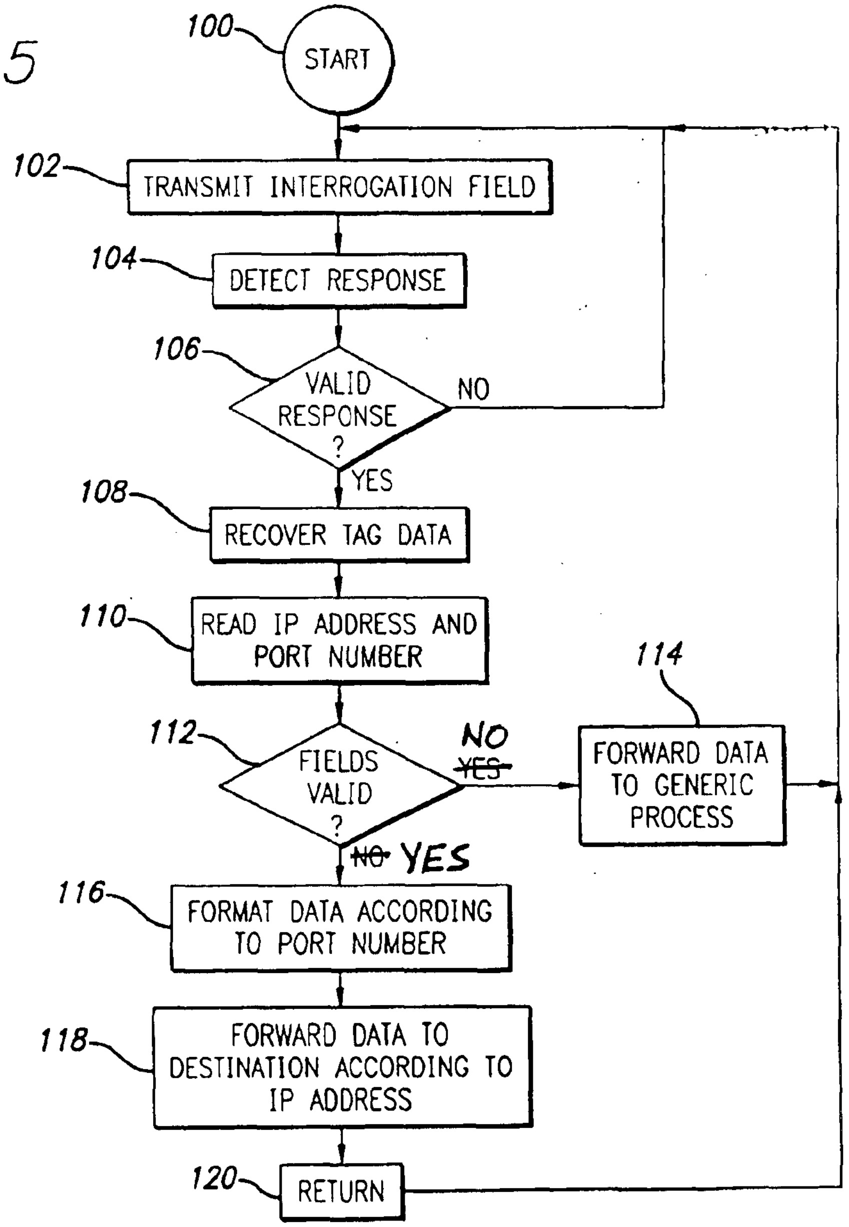
FIG. 5 is a flow chart illustration operation of the RFID reader.

Referring now to FIG. 5 in conjunction with FIGS. 1 and 2 (described above), an exemplary process performed by the RFID reader 40 in communicating with the computer network is illustrated. The exemplary process would likely be encoded in the form of software instructions that are stored in the memory 48 of the RFID reader 40 and executed by the processor 46. The process begins at step 100 and is followed by steps that form a continuous loop. In a first part of the loop, the RFID reader 40 attempts to communicate with RFID tags 14 that may be within a communication range. At step 102, the RFID reader 40 transmits an interrogation field that may comprise a modulated RF signal and/or a continuous wave signal. If an RFID tag 14 is within the transmitting range of the RFID reader 40, the RFID tag may communicate a response back to the RFID reader using backscatter modulation. At step 104, the RFID reader 40 attempts to detect a response signal communicated by the RFID tag 14. Then, at step 106, the RFID reader 40 makes as determination as to whether a detected response was valid, i.e., whether a response signal originated from an RFID tag 14 or was an erroneous noise signal. If the response is determined to be not valid, the process returns to step 102 and the RFID reader 40 transmits another interrogation field. In this manner, the RFID reader 40 will attempt to communicate with an RFID tag on a periodic basis.

If at step 106 the detected response is determined to be valid indicating that an RFID tag 14 is present within the interrogating field, the RFID reader 40 communicates with the RFID tag and attempts to recover the data stored in the memory of the RFID tag. The recovered data is then transferred into memory of the RFID reader 40 for additional processing. At step 110, the processor 46 reads the designated fields of the recovered data to identify an IP Address and Port Number. Then, at step 112, the processor 46 determines whether the designated fields contain valid data. As described above, there are many different types of RFID tags that may be operative within a common field. It is therefore expected that certain types of RFID tags may be encoded with an IP Address and Port Number in designated fields, while other types of RFID tags may be programmed using an unknown protocol whereby the data in the designated fields would be unrecognizable and therefore not valid. If the IP Address and Port Number cannot be detected, indicating either an unknown tag protocol or a known protocol with the fields blank, the RFID reader 40 may simply forward the recovered tag data to a generic process in the server 22 for further processing. The generic process may comprise one of the application programs 64*a*–64*c* illustrated in FIG. 4. Alternatively, the RFID reader 40 may simply discard the recovered data if the IP Address and Port Number fields prove to be not valid. Thereafter, the process returns to step 102 to attempt communication with another RFID tag.

If a valid IP Address and Port Number is identified from the recovered RFID tag data at step 112, the process enters a third portion of the continuous loop. Using the Port Number, the processor 46 will determine the protocol used by the RFID tag 14 and the associated software application that supports the protocol. At step 116, the processor 46 determines a message format based on the protocol defined by the Port Number and generates a data packet containing the RFID tag data formatted in accordance with the defined protocol. The processor 46 may access a table that relates each Port Number to a particular protocol and message format. Then, at step 118, the processor 46 forwards the message to the server 22 using the IP Address information as an ultimate destination for the data packet. Thereafter, the process returns to step 102 to attempt communication with another RFID tag.

In an exemplary application of the present invention, the RFID tags 14 may be used by a shipping company within labels affixed to packages. The RFID reader 40 may be located within a trans-shipment point that packages pass through on their way to a final destination. The Port Number may indicate that an e-mail application is designated, whereupon the processor 46 will prepare a data packet using data recovered from the RFID tag 14 to be transferred to the e-mail application in the server. The e-mail application would then forward an e-mail message to a destination computer system identified by the IP Address data, such as a client computer 24 directly connected to the computer network or the remote client computer 34 connected through the LAN/WAN. The destination computer system may belong to the customer, and the e-mail message may thereby notify the customer of the time and date in which the package reached the trans-shipment point. The e-mail message may contain additional information determined by the designated protocol, such as the temperature at the trans-shipment point that may be of interest in the shipment of perishable goods.

Alternatively, the Port Number may designate a Website host application program, whereupon the processor 46 will prepare a data packet using data recovered from the RFID tag 14 to be transferred to the Website host application. The recovered data may then be posted on a Website that may be accessed by the remote client computer 34. The IP Address may be used to provide a security feature whereby only the destination computer system identified by the IP Address would be able to access the tag information posted on the Website. As in the preceding example, the Website may provide the customer with the time and date in which the package reached the trans-shipment point, as well as other information such as temperature. In a similar manner, the Port Number may designate a database application program on the server 22 and the IP Address may simply identify the server. Client computers 24 connected to the server 22 could then access the RFID tag data through the data base application program. It should be appreciated that numerous other types of application programs could make use of the RFID tag information, and specific protocols could be adopted to define message formats for the RFID tag information to interface properly with the application program.

Having thus described a preferred embodiment of networking applications for automated data collection, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A computer network comprising:

a server having a plurality of application programs operating thereon;

a plurality of client computers connected to said server; and an RFID reader connected to said server and being adapted to communicate with a plurality of RFID tags each having a memory containing plural data fields for storage of data, said RFID reader comprising:

a radio module and a processor connected to said radio module, said radio module being responsive to commands provided by said processor to perform transmit and receive operations with said plurality of RFID tags; and a memory coupled to said processor and having program instructions stored therein, said processor being operable with said memory to execute said program instructions, said program instructions including:

detecting data loaded in said plural data fields of said memory of at least one of said plurality of RFID tags, wherein said plural fields include at least a first data field defining an address corresponding to either said server or one of said plurality of client computers, and a second data field identifying one of said plurality of application programs;

generating a data packet based on at least one of said first and second data fields; and transmitting said data packet to said address;

wherein at least one of said plurality of application programs comprises an e-mail application program and said first data field defines an address corresponding to one of said plurality of client computers, said e-mail application program sending an e-mail message to said one of said plurality of client computers; and wherein said e-mail message identifies at least one of time and date of communication by said RFID reader with said at least one of said plurality of RFID tags.

2. A computer network comprising:

a server having a plurality of application programs operating thereon;

a plurality of client computers connected to said server; and an RFID reader connected to said server and being adapted to communicate with a plurality of RFID tags each having a memory containing plural data fields for storage of data, said RFID reader comprising:

a radio module and a processor connected to said radio module, said radio module being responsive to commands provided by said processor to perform transmit and receive operations with said plurality of RFID tags; and a memory coupled to said processor and having program instructions stored therein, said processor being operable with said memory to execute said program instructions, said program instructions including:

detecting data loaded in said plural data fields of said memory of at least one of said plurality of RFID tags, wherein said plural fields include at least a first data field defining an address corresponding to either said server or one of said plurality of client computers, and a second data field identifying one of said plurality of application programs;

generating a data packet based on at least one of said first and second data fields; and transmitting said data packet to said address wherein at least one of said plurality of application programs comprises a website hosting program, said website hosting program posting information on a website regarding said at least one of said plurality of RFID tags.

3. The computer network of claim 2, wherein said program instructions further comprise periodically transmitting an interrogating field to communicate with said plurality of RFID tags.

4. The computer network of claim 2, wherein at least one of said plurality of application programs comprises an e-mail application program and said first data field defines an address corresponding to one of said plurality of client computers, said e-mail application program sending an e-mail message to said one of said plurality of client computers.

5. The computer network of claim 2, wherein said information regarding said RFID tag is only accessible from said website by one of said plurality of client computers identified by said first data field.

6. The computer network of claim 2, wherein said first data field further defines an IP address.

7. The computer network of claim 2, wherein said second data field further defines a Port Number.

* * * * *